US005383134A

United States Patent [19]

Wrzesinski

[11] Patent Number: 5,383,134

[45] Date of Patent: Jan. 17, 1995

[54] DATA TRANSMISSION DEVICE, SYSTEM AND METHOD

[75] Inventor: Stanley Wrzesinski, Arlington Heights, Ill.

[73] Assignee: Motorola, Inc., Schaumburg, Ill.

[21] Appl. No.: 247,621

[22] Filed: May 23, 1994

Related U.S. Application Data

[63] Continuation of Ser. No. 997,390, Dec. 28, 1992, abandoned.

[51] Int. Cl.[6] ........................ G08C 17/00; H04K 1/00; H04B 15/00

[52] U.S. Cl. ................................ 364/514; 340/870.03; 340/870.06; 340/870.11; 340/825.54

[58] Field of Search ........................ 340/870.03, 870.06, 340/870.011, 875.54; 364/514, 464.04, 492, 516, 514

[56] References Cited

U.S. PATENT DOCUMENTS 4,414,661 12/1983 Karlstrom ............................ 370/95
4,799,059 1/1989 Grindahl et al. ............... 340/870.03
5,056,107 10/1991 Johnson et al. ............ 340/870.06 X

FOREIGN PATENT DOCUMENTS 3119119 12/1982 Germany .
2234617 6/1991 United Kingdom .

OTHER PUBLICATIONS

"SAE Truck and Bus Standard J1708, Jan. 1986", pp. 1–9.

*Primary Examiner*—Emanuel T. Voeltz
*Assistant Examiner*—Kamini Shah
*Attorney, Agent, or Firm*—Phillip H. Melamed

[57] ABSTRACT

A data transmission device (11; 111,) for use in a system (10) comprising a plurality of such devices is described along with a corresponding method of data transmission. A data signal (at 23) is provided for transmission and a timer apparatus (16, 18; 16, 118, 160) establishes a sequence of maximum time intervals (6 hours; 6 hours and 20 seconds) during which the data signal can be transmitted. A transmitter (18, 24, 25; 118, 24, 25) transmits the data signal during each of these maximum time intervals. The timer apparatus (16, 18; 16, 118, 160) generates a random number (steps 33, 54; steps 172, 195) for each one of the maximum time intervals, and the transmitter (18, 24, 25; 118, 24, 25) determines the transmission times for the data signal in accordance with the random numbers provided for each of these maximum time intervals. Preferably, the data transmission devices are part of a data transmission system (10) which includes a data receiver (12), and the data signal is obtained from and corresponds to the output of a utility meter (13). By utilization of random numbers to randomize the transmit times of the transmission devices, the probability that data transmissions from one transmission device will interfere with data transmissions from another device is substantially minimized.

25 Claims, 7 Drawing Sheets

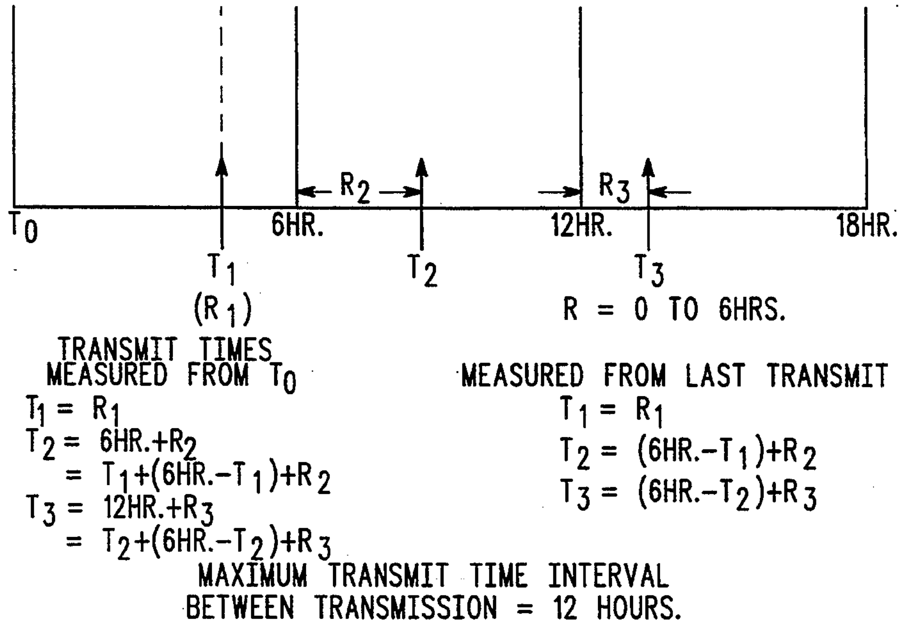
FIG. 5
FIG. 6
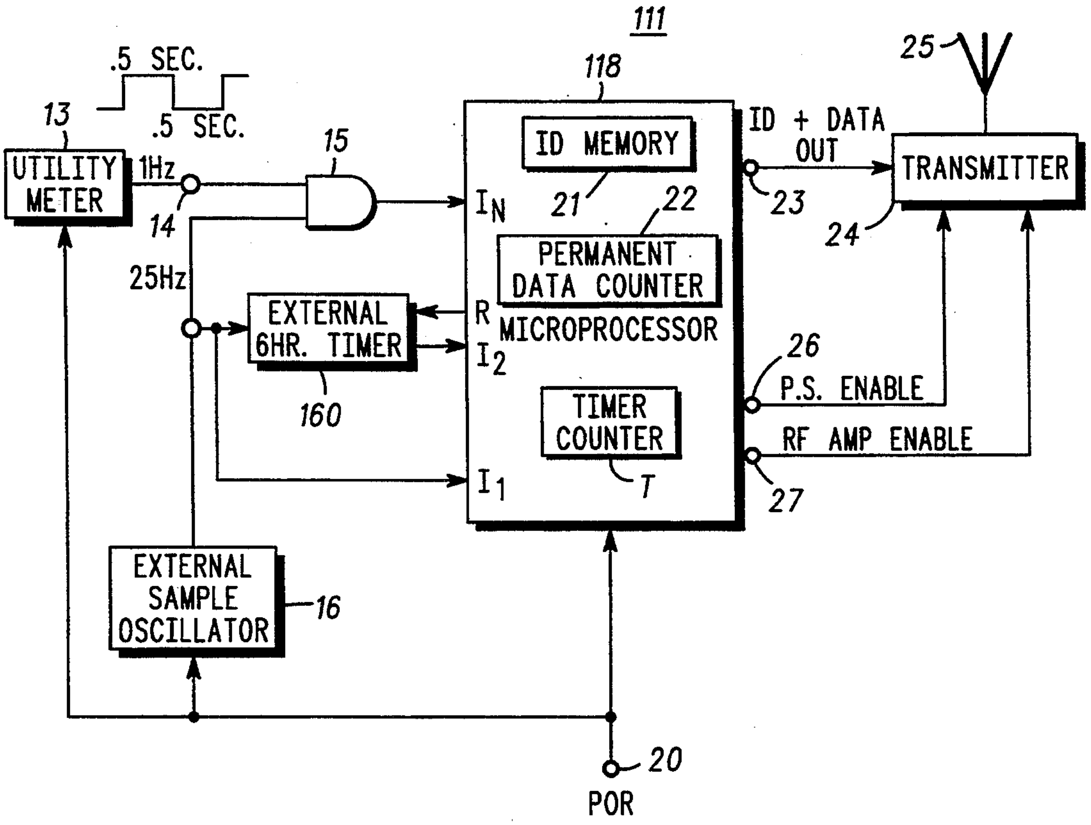

TRANSMIT TIMES
MEASURED FROM $T_0$ $T_1 = R_1$ $T_2 = T_1 + 6HR. + R_2$ $T_3 = T_2 + 6HR. + R_3$

MEASURED FROM LAST TRANSMIT $T_1 = R_1$ $T_2 = 6HR. + R_2$ $T_3 = 6HR. + R_3$ $R_1 = R_i = 0$ TO 6HRS.

$R_N = 0$ TO 20 SECS.

MAXIMUM TRANSMIT TIME INTERVAL
BETWEEN TRANSMISSION = 6 HOURS + 20 SECONDS.

DATA TRANSMISSION DEVICE, SYSTEM AND METHOD

This is a continuation of application Ser. No. 07/997,390filed De. 28, 1992 and now abandoned.

FIELD OF THE INVENTION

The present invention relates to the field of data transmission devices, systems utilizing such devices and methods for implementing data transmission. More particularly, the present invention has applicability to independently operative utility meter reading devices which transmit utility meter readings to a central data receiver location, preferably by wireless radiation communications.

BACKGROUND OF THE INVENTION

Utility meter reading systems have been proposed in which a utility meter reading device is provided in conjunction with each utility meter. In some of these meter systems the reading devices comprise data transmission devices which transmit utility meter reading data to a central meter reading location. Such central reading systems allow the remote reading of utility meters without requiring the physical reading of individual meters at their locations by meter reading persons. In other words, such systems eliminate the need for a meter reader person visiting each and every meter location in order to read the meters. By "utility meters" what is meant is a meter which measures the use of a commercial or residential utility resource, such as electricity, gas, water, etc.

In systems which provide for the remote reading of a plurality of utility meters, one problem that may occur is that several meters may attempt to transmit their data to the same central location at the same time. This can result in data collisions and destruction of meter reading data such that an accurate reading of the meters may not be obtained. Some systems have proposed periodic transmission of meter data by each individual meter to cut down on data transmit time by each device, but, the data collision problem still exists since several meter may wind up transmitting at the same time and have the same transmission period. Thus an interference condition could therefore persist indefinitely.

Some prior systems have proposed detecting when data collisions exist due to several devices transmitting data at the same time. In response to such a data collision detection, the transmission times of one or more of the transmitting devices is then altered. While such systems are feasible, this requires a communication and control path to each of the meter devices which are transmitting so as to alter their transmit times. This involves a substantial additional expense in providing this additional control path. Therefore this is clearly not an optimum solution since it requires providing each meter transmitter with receiver and control circuitry Just to avoid repetitive data collisions.

Some systems have proposed commencing periodic transmission of meter data when the meter reading transmitter first has power applied to it. This provides some transmit time randomization to the transmit data because each meter device will probably be initially activated at a different time. However, when a very large number of meter devices are located in the same general area, there is nothing which guarantees that several meter devices will not have initial power applied to them at times separated by multiples of the transmission period so as to prevent continuous periodic data collisions. An improved data transmission device for use in a system having a plurality of data transmission devices is therefore needed.

SUMMARY OF THE INVENTION

In one embodiment of the present invention, a data transmission device for use in a system comprising a plurality of such data transmission devices is provided. The data transmission device includes means for providing a data signal for transmission, timer means for establishing a sequence of maximum time intervals during which said data signal can be transmitted, and means for transmitting said data signal at a transmission time during each of said maximum time intervals. The timer means includes a random number generator for providing a series of random numbers with one of these random numbers being provided for each of the maximum time intervals. The transmitting means determines the transmission times for the data signal during each of the maximum time intervals in accordance with the one random number provided for that maximum time interval. A system comprising a plurality of such data transmission devices as described above is also disclosed herein as well as the method of data transmission corresponding to the operation of such devices.

Use of the random number generator, as noted above, substantially minimizes the possibility that repetitive data collisions will occur. This therefore results in a data transmission system in which a very large number of data transmission devices can be utilized in close proximity to one another without any substantial possibility of repetitive data collisions. This advantage, as well as others, are more fully explained subsequently.

BRIEF DESCRIPTION OF THE DRAWINGS

The present invention can be better understood by reference to the drawings in which:

FIG. 5 is a combination graph and chart which illustrates transmit times implemented by the data transmission device shown in FIG. 2;

FIG. 6 is a schematic diagram illustrating another embodiment of a data transmission device usable in the system shown in FIG. 1;

DESCRIPTION OF THE PREFERRED EMBODIMENTS

Figure 1:
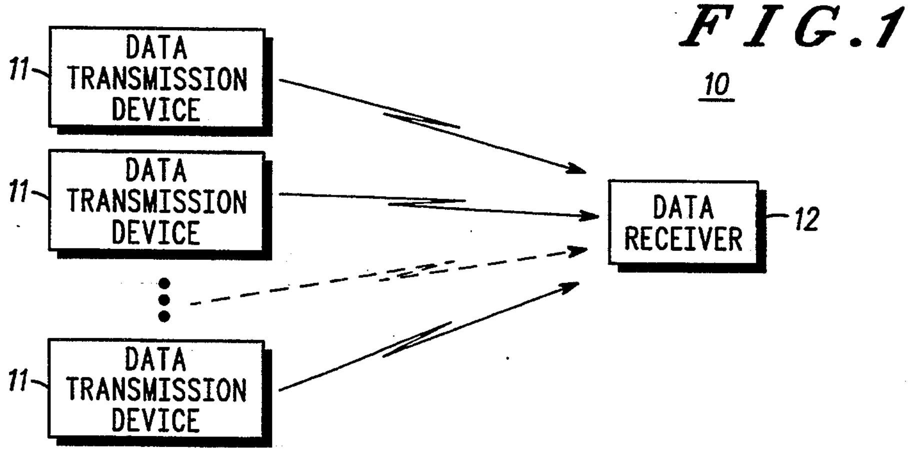
FIG. 1 is a schematic diagram of a data transmission system constructed in accordance with the present invention.

Referring to FIG. 1, a data transmission system 10 is illustrated as comprising a plurality of independently operative data transmission devices 11 each of which transmits a data signal, preferably via wireless radio communications, to a central data receiver 12. Preferably, each of the data transmission devices 11 corresponds to a utility meter reading device in which a data signal related to the use of a utility is provided and then transmitted to the data receiver 12 which implements remote reading of a plurality of the utility meters. Utility meters associated with the devices 11 measure the use of any residential or commercial utility resource such as electricity, gas, water or other utility resources.

Figure 2:
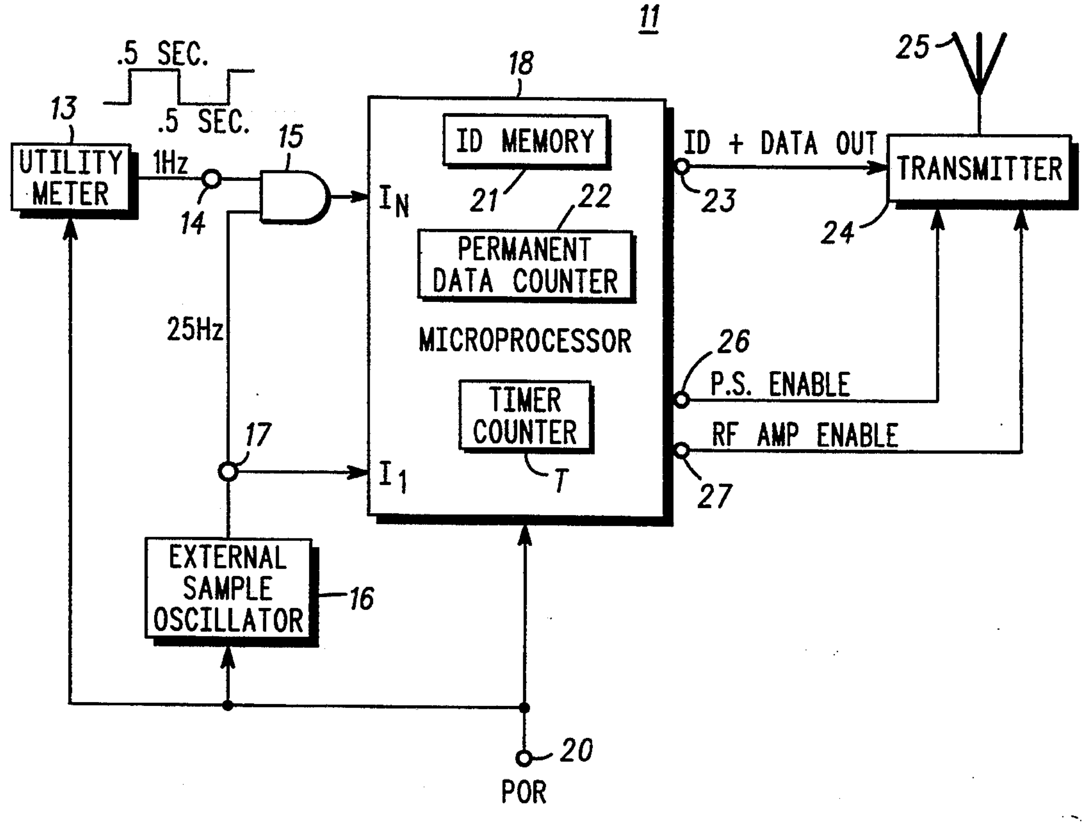
FIG. 2 is a schematic diagram of a data transmission device utilized in the system shown in FIG. 1.

Referring to FIG. 2, a preferred embodiment for one of the data transmission devices 11 is illustrated as including a conventional utility meter 13. The meter 13 provides a periodic one hertz signal having one half second on and off periods indicative of and during utilization of a utility resource measured by the meter 13. This one hertz use signal is provided at a terminal 14 which is an input to an AND gate 15. An external sample oscillator 16 provides a 25 hertz sampling signal at a terminal 17 that is provided as an input to the AND gate 15. The AND gate 15 provides a gated data output signal as its output which is connected to an input $I_N$ of a microprocessor 18. The 25 hertz sampling signal at terminal 17 is also provided as an input to the microprocessor 18 at an interrupt terminal $I_1$. Operative power to the microprocessor, the external sample oscillator and the utility meter is provided at a power on reset terminal 20 at which it is contemplated a remote power source, such as a battery, will be connected. The initial connection of power to the terminal 20 will also trigger the resetting of the microprocessor 18, as well as the resetting and turning on of the external sample oscillator 16 and the utility meter 13.

The microprocessor 18 has internal to it a utility meter ID code stored in an ID memory 21. In addition, the microprocessor also has a permanent data counter 22 which is contemplated as accumulating, in non volatile memory, a data count $D_p$ related to the total utilization of the utility resource being measured by the utility meter 13. In essence, the ID memory 21 identifies what meter is being read and the permanent data counter 22 accumulates the count $D_p$ related to the total accumulated utilization of the utility resource as measured by the utility meter 13. A timer counter T internal to the microprocessor 18 stores a next transmit count $T_{RN}$ which determines the data transmit times of a transmitter 24.

At an output terminal 23 the microprocessor 18 provides, at appropriate times, a data signal comprising the ID information in the memory 21 and the accumulated data output Dp provided by the permanent data counter 22. The output terminal 23 data signal is coupled to an RF transmitter 24 having an antenna 25 for wireless radiation of the data signal provided by the microprocessor 18. In addition, the microprocessor provides at a terminal 26 a power supply enable signal to the transmitter 24 and, at a terminal 27, an RF amplifier enable signal.

Essentially, programing of the microprocessor determines when meter information should be transmitted via the transmitter 24 and antenna 25. If data transmission is to occur, first power is applied to the transmitter power supply due to the power supply enable signal provided at the terminal 26. After a suitable delay to quiet transients in the transmitter, power is then applied to the RF amplifier stage of the transmitter due to the RF amplifier enable signal at terminal 27. At this time the microprocessor provides the data signal which is to be transmitted at the terminal 23 and the transmitter transmits this data signal via the antenna 25.

As stated previously, a system utilizing a plurality of such data transmission devices 11 as shown in FIG. 1 can encounter problems if several of the data transmission devices 11 transmit data at the same time. Since it is undesirable to constantly transmit information, information should be transmitted on a periodic basis so as to save power since preferably only battery power is utilized for the device 11. This will also minimize channel utilization. Even if different devices are rendered operative at different times so as to commence their periodic transmission of data at different start times, there is no guarantee that several devices in a close proximity will not be initially actuated at times which differ from each other by the period for transmitting data. In such a situation, two of the transmission devices would always interfere with one another and prior techniques of minimizing this interference would involve substantial additional expense and require additional electrical connections to the data transmission devices. However, the preferred embodiment for the present data transmission device 11 contemplates programming the microprocessor 18 so as to substantially eliminate data collisions and therefore randomize the transmissions of data while still ensuring an adequate number of data transmissions so as to enable the reading of the utility meter 13. This is accomplished in the following manner.

Figure 3:
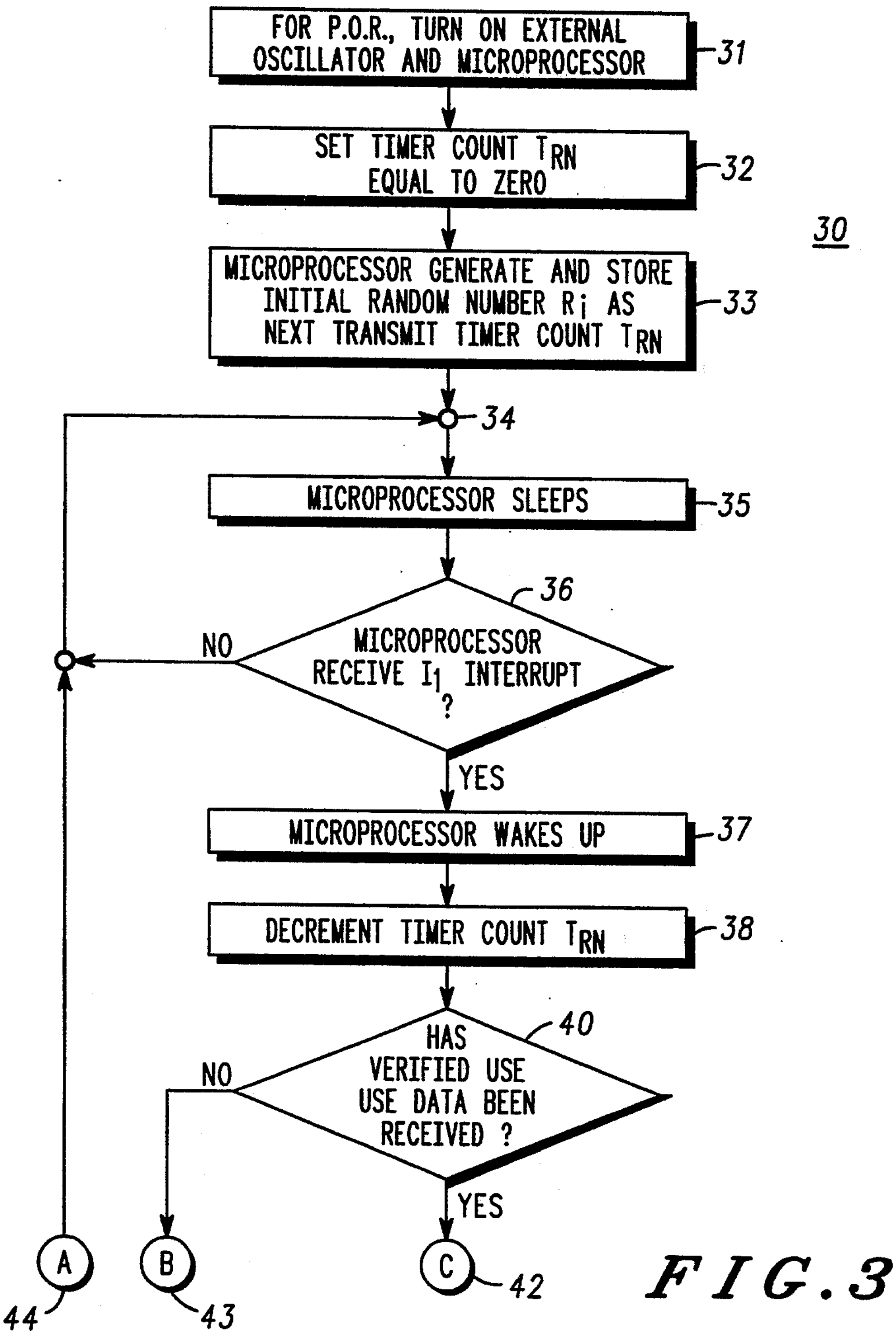
FIGS. 3 and 4 comprise a composite flowchart illustrating the operation of the data transmission device shown in FIG. 2.
Figure 4:
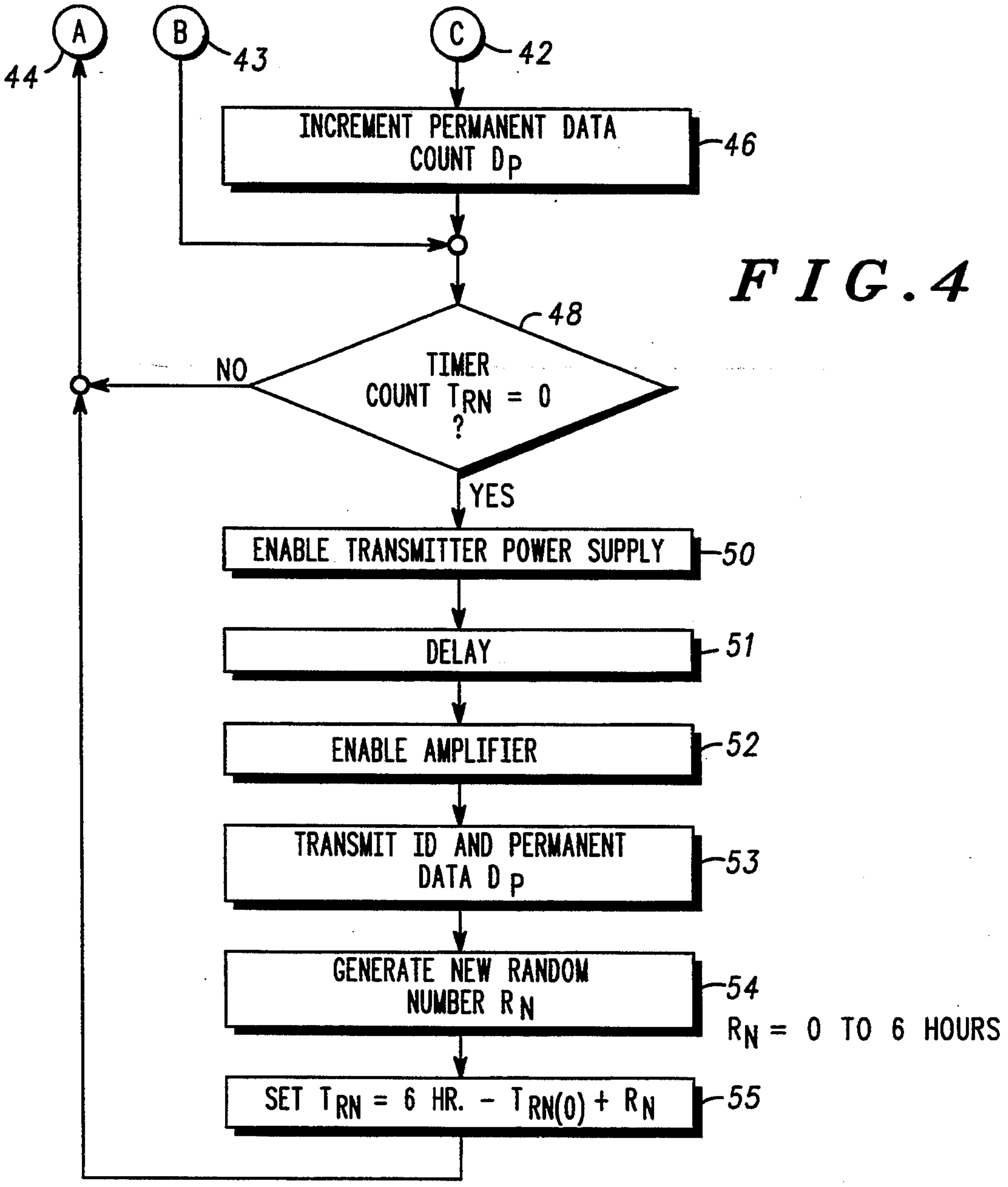

Referring now to FIGS. 3 and 4, these figures represent a composite flowchart illustrating the operation of the data transmission device 11. The flowchart essentially corresponds to the programmed operation of the microprocessor 18 in conjunction with the external oscillator 16, the utility meter 13 and the transmitter 24. Referring to FIG. 3, a flowchart 30 shown therein is entered at an initial step 31 representing the application of power to the power on reset (POR) terminal 20. This results in turning on the microprocessor 18 and oscillator 16 and commencing operation thereof.

A subsequent step 32 then corresponds to the microprocessor setting the internal timer counter T such that the next transmit timer count $T_{RN}$ is equal to zero.

A subsequent step 33 corresponds to the microprocessor 18 generating an initial random number $R_i$ and then storing this as the next transmit timer count $T_{RN}$ in the timer counter T. Control then passes to a junction terminal 34 and then on to a step 35 designated as the microprocessor sleeping. This sleeping step essentially means that operative power to various portions of the microprocessor may now be minimized because until the microprocessor wakes up, due to the receipt of an interrupt signal, the microprocessor will not be performing any substantial function and therefore will not be consuming any substantial power. A decision step 36 essentially represents an inquiry as to if the microprocessor 18 has received an interrupt at its interrupt terminal $I_1$. If not, the microprocessor continues to sleep. Since the interrupt terminal $I_1$ is connected to the terminal 17 at which the 25 hertz oscillator signal is provided, clearly the microprocessor will wake up for each pulse produced as part of the 25 hertz signal. When this happens, the microprocessor wakes up per step 37 and then proceeds, per step 38, to decrement by one count the timer counter T in which the transmit timer count $T_{RN}$ is stored.

Subsequently, the microprocessor via a decision step 40 samples the data provided at its input terminal $I_N$ and determines if verified use data has been received. If not, control passes to a terminal 43 which appears in both FIG. 3 and FIG. 4, and then to a decision step 48 to be described subsequently. The determination of the receipt of verified use data can involve, for example, testing the data at the terminal $I_N$ for several sequential 25 hertz pulses to insure proper detection of the 1 hertz use signal at terminal 14. If there was no utilization of a utility resource, then there would be no 1 hertz use signal. The above contemplated multiple testing could be implemented by a temporary data counter in the microprocessor 18.

Once verified use data has been received, per step 40, control passes to terminal 42, which appears in both FIG. 3 and FIG. 4, and then on to step 46. The step 46 results in a one digit increment of the permanent data count $D_p$ that is stored in the permanent data counter 22. This permanent data count Dp is indicative of total accumulated use of a utility resource as measured by the transmission device 11 shown in FIG. 2.

After step 46, control passes to a decision step 48 which inquires if the count $T_{RN}$ in the timer counter T has been decremented such that it is now equal to zero. If not, control passes to the terminal 44 which is shown at the top of FIG. 4 and also at the bottom of FIG. 3 to indicate that control will eventually pass back to the junction 34. Step 48 essentially implements a timer countdown function such that until the timer count $T_{RN}$ equals to zero, all of the preceding steps 35 through 46 will continue to be implemented. Once the timer count $T_{RN}$ does equal zero, control from the step 48 passes to a process step 50 which enables the transmitter power supply via the signal provided by the microprocessor at the terminal 26. This essentially corresponds to providing power supply power to the transmitter 24.

After a time delay implemented by a step 51, during which transients in the transmitter 24 will have now died down, the microprocessor, via a step 52, enables the transmitter RF stage so that it can transmit. This is implemented by the signal provided at the terminal 27. Then the transmitter 24 will transmit the ID and permanent data count $D_p$ which the microprocessor has provided at the terminal 23 as a data signal. This is implemented by a step 53.

After the step 53, the microprocessor now generates a new random number $R_N$ for utilization in determining the next transmit time. Flowchart step 55 illustrates how this random number $R_N$ is utilized to set the next transmit time count $T_{RN}$. Per the equation in step 55 the next transmit time $T_{RN}$ will be equal to a count equivalent to a six 5 hour time period, minus a count equal to the last previous maximum transmitter count that had been stored in the timer counter T, plus a count equivalent to the new random number $R_N$ provided by the step 54. The step 55 presupposes that a register in the microprocessor 18 Will always keep track of the previous maximum transmit count $T_{RN}$ that is loaded into the transmit timer counter T that is decremented by the step 38. After the step 55 control passes to the terminal 44 and from there to the junction 34 to recommence operation of the flowcharts in FIGS. 3 and 4.

What has been described above ensures sufficient randomization of each data transmission device 11 such that two such transmission devices have substantially no probability of continually generating data collisions because each is continually transmitting data at the same time. The manner in which the flowcharts in FIGS. 3 and 4 provide such randomization of transmission can best be visualized by reference to FIG. 5 in which a series of three random transmissions $T_1$ through $T_3$ are illustrated on a timeline graph extending over the first initial 18 hours from the initial application of power at the time $T_0$. To best understand this process it should be noted that the initial random number $R_i$ as well as the subsequent random numbers $R_N$, provided by the steps 33 and D4 in the flowcharts in FIGS. 3 and 4, comprise random numbers equivalent to counts corresponding to any time period between 0 and 6 hours wherein incrementing of these counts occurs at the 25 hertz rate of the oscillator signal provided at the terminal 17.

Referring to FIG. 5, the first transmission time $T_1$ will occur when the initial random number $R_i$, which is also referred to as $R_1$ , is decremented to 0 by counting a sufficient .number of pulses corresponding to the 25 hertz sampling signal at the terminal 17. As stated above, this can occur anywhere between a time period of 0 to 6 hours. The next transmission $T_2$, if the transmit time is measured from the initial time $T_0$, is actually equal to 6 hours plus a time corresponding to the random number $R_2$ generated by the step 55 after the first transmission at the time $T_1$. In FIG. 5, two different columns are illustrated to demonstrate the occurrence of the transmit times $T_1$ through $T_3$ as measured either from the initial time $T_0$ or as measured from the last transmit time.

With respect to time $T_0$, $T_2$ occurs at 6 hours plus a count equal to the second random number $R_2$ that is generated by the microprocessor 18. The step 55 implements this because the second random number $R_2$ is generated substantially at the time $T_1$. As measured from the time $T_1$, the equation in step 55 calculates the passage of a 6 hour time less the actual elapsed time between the time $T_0$ and the time $T_1$. This elapsed time represents the remaining portion of an initial 6 hour maximum transmit time interval which can exist between a series of continuous sequential transmissions set up by the device 11.

Through the utilization of the equation implemented by the step 55, the transmission device 11 ensures that for a maximum transmit time interval of 12 hours there will be one transmission of data somewhere within this interval. The use of random numbers as described above ensures that each data transmission device will have each of its actual transmission times sufficiently randomized such that they will not conflict with the transmission times of other devices 11 on a continuing basis. This occurs because each random number is utilized in the determining of the actual transmission time for a data transmission device, and these transmission times and the operation of the random number generators in each data transmission device 11 occur independently of the operation of other data transmission devices 11. For the embodiment shown in FIG. 2 and described in the flowcharts in FIG. 3 and 4, it can be seen that the maximum transmit time interval which can exist between data transmissions is equal to a fixed time interval of 12 hours for the devices 11 shown in FIG. 2. The device 11 has established a continuous series of maximum time intervals during which data transmissions may occur, and has insured random transmission times within .each such maximum time interval. The end result is that randomization of transmission has been implemented while the system ensures at least one transmission of utility meter data every 12 hours.

Referring now to FIG. 6, an alternate embodiment for a data transmission device 11 is illustrated as comprising a data transmission device 111. The composition of the device 111 is substantially similar to the device 11 and individual components and terminals which function substantially identically have been given the exact same reference numerals. However, the programming of a microprocessor 118, corresponding to the microprocessor 18 in FIG. 2, is somewhat different and that is why the microprocessor in FIG. 6 has been given a different reference numeral. In addition, this microprocessor also has a second interrupt terminal $I_2$ which receives an input from an external 6 hour timer 160 and the microprocessor provides a reset signal as an input to this timer 160, by virtue of a reset output terminal R.

Essentially, the transmission device 111 differs from the device 11 in that smaller random numbers are generated for each transmission time, except the initial transmission time $T_1$, and an external 6 hour timer 160 is utilized to provide at least a 6 hour time interval between data transmissions which occur. The embodiment in FIG. 6, while requiring a 6 hour external timer and therefore somewhat increasing the cost of circuitry, may sometimes be preferable to the configuration for the device 11 shown in FIG. 2 since the microprocessor itself will not have to constantly implement a very extensive countdown of 25 hertz pulses to implement a 6 hour time period. Rather, the device 111 will, after the initial transmission T1, just implement a 0 to 20 second countdown after the external timer 160 has indicated that 6 hours has elapsed since the last transmission. In such a situation, data transmissions are still randomized but are now spread over a 0 to 20 second interval added on to a fixed time interval of 6 hours. Thus, the maximum transmit time interval to be implemented by the transmission device 111 in FIG. 6 is now 6 hours and 20 seconds. This is apparent by reviewing the flowcharts shown in FIGS. 7 and 8 and the charts and graphs shown in FIG. 9 as will now be briefly explained.

Figure 7:
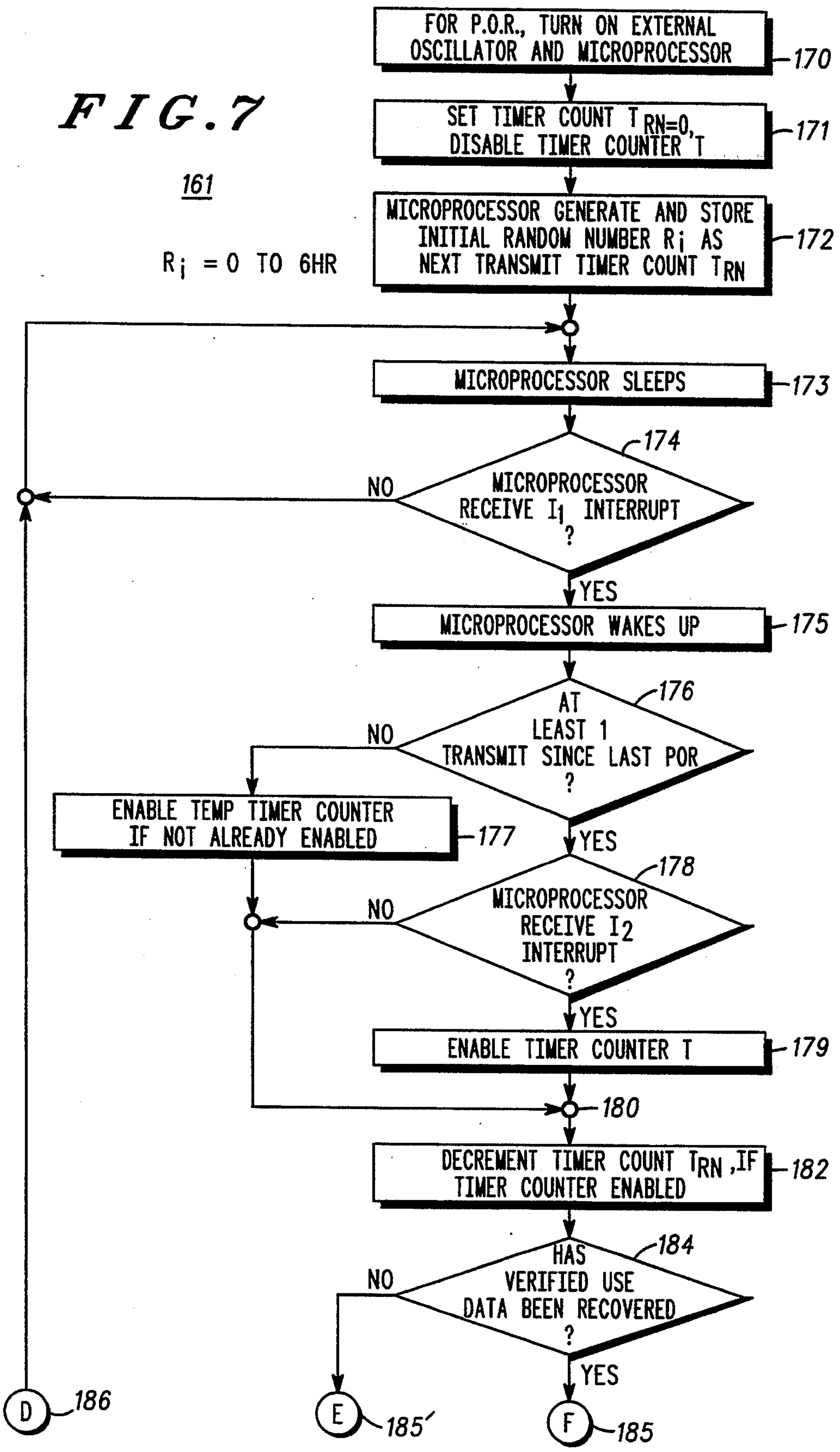
Figs. 7 and 8 comprise a composite flowchart illustrating the operation of the data transmission device show, in FIG. 6.
Figure 8:
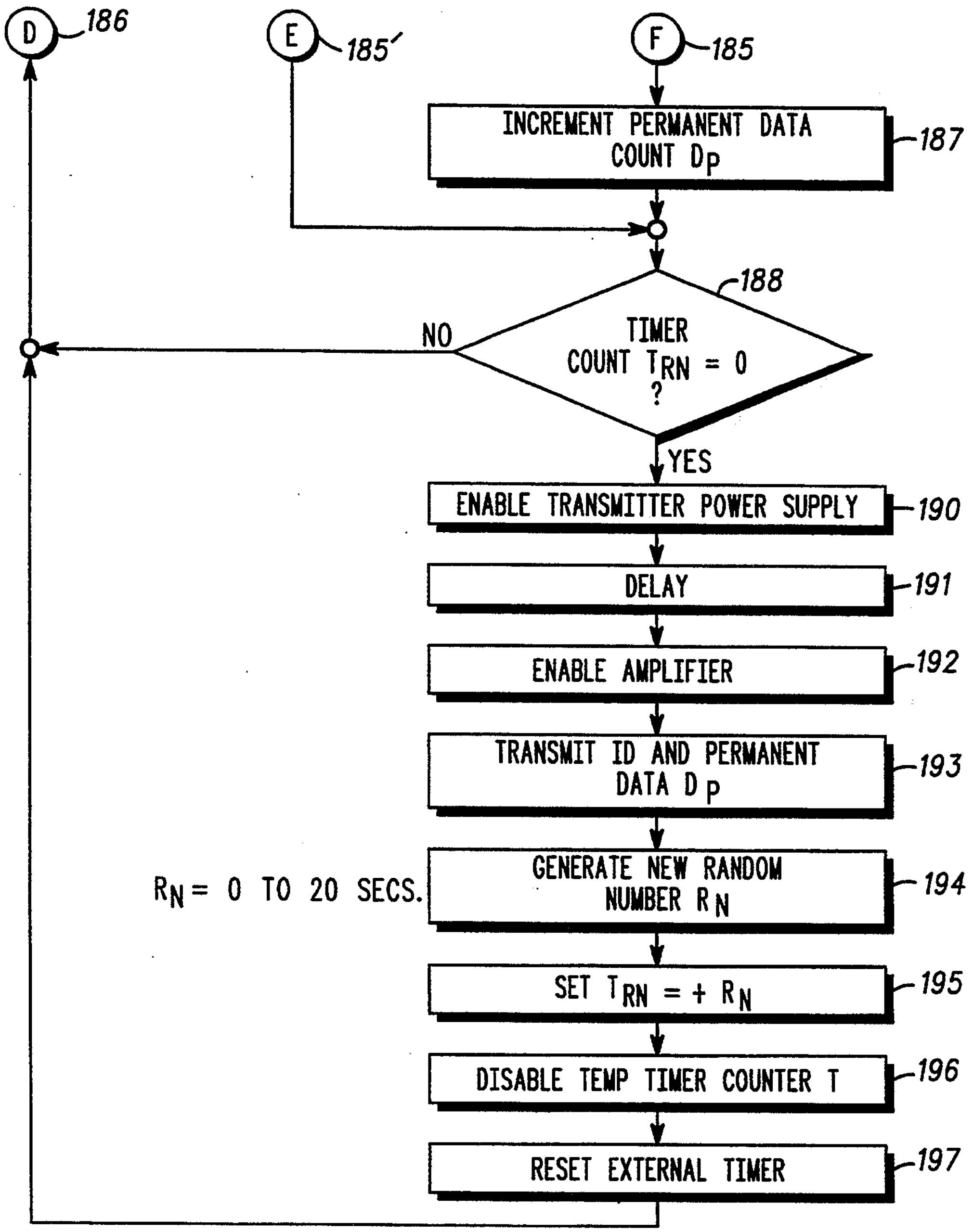

Referring now to FIGS. 7 and 8, a composite flowchart 161 is illustrated having common junction terminals 185 and 186 shown in both of the FIGS. 7 and 8. An initial step 170 in the flowchart is identical to the step 31 in FIG. 3, and a subsequent step 171 substantially corresponds to the previous step 32 except that now the step 171 will also disable the timer counter T and thereby prevent it from incrementing for each received 25 hertz pulse until this counter T is enabled. A step 172 generates an initial random number $R_i$ which again, for the determination of the first transmit time $T_1$, will extend anywhere between a number equivalent to 0 to 6 hours as measured by counting 25 hertz sampling pulses.

Subsequent steps 173 through 175 are identical to the prior steps 35 through 37 shown in FIG. 3. However, after step 175, a new decision step 176 is implemented which together with steps 177 through 179 essentially functions to allow the timer counter T in which the count $T_{RN}$ is stored to count every 25 hertz pulse so as to determine the initial transmit time $T_1$, but only count such 25 hertz pulses for determining subsequent transmission times ($T_2$, $T_3$, etc.) once the step 178 has determined that it has received a $I_2$ interrupt signal from the external 6 hour timer 160. In other words, after the initial transmit time $T_1$, the transmit device 111 in FIG. 6 will implement a 6 hour time period and then a 0 to 20 second random number will be incremented down at the 25 hertz rate after the occurrence of the timing out of the external 6 hour timer 160.

After the step 179, a step 182 decrements the counter T in which the count TRN is stored if this counter T has been enabled. As noted above, this counter T will be enabled throughout the initial time between $T_0$ and $T_1$, the first transmit time, and for every subsequent transmit time after the timing out of the external timer 160. This is the function intended to be implemented by the steps 176 through 179. After the decrementing step implemented by step 182, the steps 184 through 193 in the flowchart 161 directly correspond to the same operations implemented by the corresponding steps in the flowchart 30 shown in FIGS. 3 and 4. However, the step 194 in FIG. 8, when it generates its new random number $R_N$, now generates this new random number at a count equivalent to a time period anywhere from 0 to 20 seconds as incremented by counting 25 hertz sampling pulses from the oscillator 16. Then a step 195 will set the next transmit time count $T_{RN}$ equal to the random number count $R_N$. Then a step 196 will disable the timer counter T having this count, and a step 197 will reset the external timer 160 by providing a suitable reset pulse at the microprocessor terminal R. Control then will pass back to the terminal 186 and from there to the terminal which immediately proceeds the step 173.

Essentially, the flowchart in FIGS. 7 and 8 illustrates that now the external time 160 will count the 25 hertz pulses at the terminal 17 and provide a 6 hour time interval signal to the microprocessor 118 by providing a signal to the interrupt terminal $I_2$ every 6 hours. This eliminates the need for the microprocessor 118 to count all of these pulses to implement a 6 hour time period. After the initial or first transmit time $T_1$, the microprocessor will essentially be disabled from counting the 25 hertz pulses to decrement a count determining the next transmit time until the 6 hour interrupt has been provided by the external timer at the input terminal $I_2$. Then, a much smaller transmit count corresponding to a random number equivalent to a time between 0 and 20 seconds will be decremented towards 0, and when this timer count $T_{RN}$ is equal to 0 transmission will occur.

Figure 9:
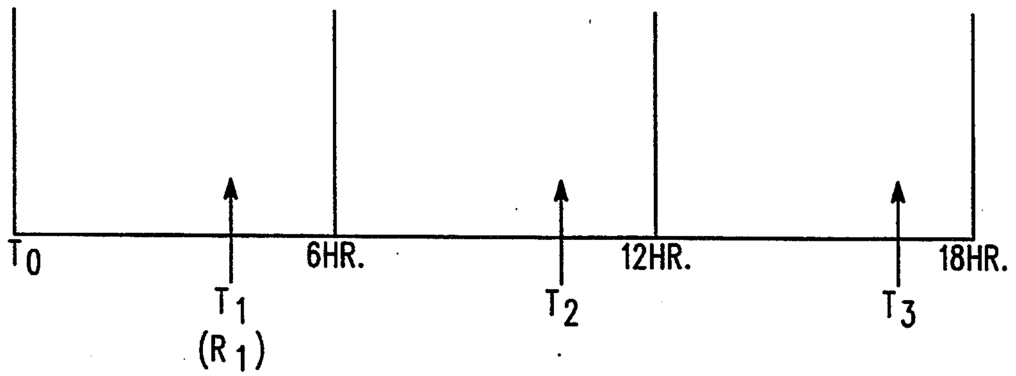
FIG. 9 is as combination graph and chart which illustrates the transmission times implemented by the data transmission device shown in FIG. 6.

Referring to FIG. 9, a graph and chart demonstrating the operation of the device 111 is illustrated in the same format that the graph and chart in FIG. 5 illustrates the operation of the device 11 shown in FIG. 2. FIG. 9 again emphasizes that the initial random number count $R_1$ is a count equivalent to counting of 25 hertz pulses to provide a time period of anywhere between 0 and 6 hours, but that all subsequent random numbers $R_N$ which determine the transmit times $T_2$and onward vary only between counts equivalent to time periods of 0 to 20 seconds. Thus, the maximum time interval between transmissions implemented by the transmission device 111 is not 12 hours, as was the case for the device 11, but is now 6 hours plus 20 seconds. The embodiment in FIG. 6 corresponding to the device 111 ensures that transmissions will not occur any sooner than 6 hours apart, but will occur no later than 6 hours and 20 seconds apart. This is believed to provide sufficient randomization, but clearly the transmission device 11 in FIG. 2 will provide even greater transmit time randomization.

For both embodiments described herein, it is clear that power saving features have been implemented which minimize power drain on any battery source connected to the power on reset power terminal 20. The FIG. 6 embodiment may be preferable to the FIG. 2 embodiment because the FIG. 6 embodiment is more readily adaptable for battery power savings. Also, both embodiments demonstrate the utilization of random number generators which determine transmit times for each continuous sequential series of maximum time intervals that are set up for data transmissions to be implemented by a transmission device. For the transmission device 11 in FIG. 2, the maximum time intervals between transmissions are equal in duration and correspond to a fixed time interval of 12 hours. For the transmission device 111 shown in FIG. 6, the maximum time intervals between transmissions are equal to a fixed time interval of 6 hours plus a variable time interval of 0 to 20 seconds corresponding to a series of random numbers $R_N$ provided for each of the maximum time intervals after the initial transmit time interval. The 6 hour time interval implemented by the external timer 160 is clearly at least one order of magnitude, and also preferably at least two orders of magnitude greater than the variable time interval of 0 to 20 seconds implemented for the transmission device 111.

While I have shown and described specific embodiments of this invention, further modifications and improvements will occur to those skilled in the art. All such modifications which retain the basic underlying principles disclosed and claimed herein are within the scope of this invention.

I claim:

1. Data transmission device for use in a system comprising a plurality of such data transmission devices, said data transmission device comprising:

means for providing a data signal for transmission;

timer means for establishing, in response to an initial power on signal received by the device, a continuous sequence of maximum time intervals during which said data signal can be transmitted; and means for transmitting said data signal at a transmission time during each of said maximum time intervals;

said timer means including a random number generator for providing a random number for each of said maximum time intervals, said transmitting means determining the transmission time for said data signal during each of said maximum time intervals in accordance with said one of said random numbers provided for said each of said maximum time intervals;

wherein each of said maximum time intervals comprises a fixed time interval plus a variable time interval, said variable time interval being determined in accordance with said random number provided for each of said maximum time intervals, and said fixed time interval is at least one order of magnitude greater than said variable time interval, and said transmission times occur in accordance with said variable time intervals.

2. A data transmission device according to claim 1 wherein said data transmission device, said timer means, said maximum time intervals, said random number generator and, said transmission times provided for the data transmission device are independent of the operation of other of such data transmission devices.

3. A data transmission device according to claim 1 wherein said timer means comprises a fixed time interval means for establishing a fixed time interval, and wherein said maximum time intervals are determined in accordance with said fixed time interval.

4. A data transmission device according to claim 1 wherein each of said maximum time intervals are equal in duration and correspond to a fixed time interval.

5. A data transmission device according to claim 1 wherein said fixed time interval is at least two orders of magnitude greater than said variable time interval.

6. A data transmission device according to claim 1 wherein said transmitting means includes means for transmitting said data signal via wireless signal radiation.

7. A data transmission device according to claim 6 wherein said data signal providing means includes a utility meter means and said data signal is indicative of the use of a utility as measured by said utility meter means.

8. A data transmission device according to claim 1 wherein said data signal providing means includes a utility meter means and said data signal is indicative of the use of a utility as measured by said utility meter means.

9. A data transmission system comprising;

a plurality of data transmission devices each independently operative for transmitting its own data signal and;

a data receiver means for receiving the transmitted data signals from each of said plurality of data transmission devices;

each of said data transmission devices comprising;

means for providing a data signal for transmission;

timer means for establishing, in response to an initial power on signal received by the device, a continuous sequence of maximum time intervals during which said data signal can be transmitted; and means for transmitting said data signal at a transmission time during each of said maximum time intervals;

said timer means including a random number generator for providing a random number for each of said maximum time intervals, said transmitting means determining the transmission time for said data signal during each of said maximum time intervals in accordance with said one of said random numbers provided for said each of said maximum time intervals;

Wherein each of said maximum time intervals comprises a fixed time interval plus a variable time interval , said variable time interval being determined in accordance with said random number provided for said maximum time interval, and said fixed time interval is at least one order of magnitude greater than said variable time interval, and said transmission times occur in accordance with said variable time intervals.

10. A data transmission system according to claim 9 wherein said data transmission devices, said timer means, said maximum time intervals, said random number generator and Said transmission times provided for each data transmission device are independent of the operation of other of said data transmission devices.

11. A data transmission system according to claim 9 wherein said timer means comprises a fixed time interval means for establishing a fixed time interval, and wherein said maximum time intervals are determined in accordance with said fixed time interval.

12. A data transmission system according to claim 9 wherein each of said maximum time intervals are equal in duration and correspond to a fixed time interval.

13. A data transmission system according to claim 9 wherein said transmitting means includes means for transmitting said data signal via wireless signal radiation.

14. A data transmission system according to claim 9 wherein said data signal providing means includes a utility meter means and said data signal is indicative of the use of a utility as measured by said utility meter means.

15. Data transmission method comprising the steps of; providing a data signal for transmission,
establishing, in response to an initial received power on signal, a continuous sequence of maximum time intervals during which said data signal will be transmitted;
transmitting said data signal at a transmission time during each of said maximum time intervals; and
providing a random number for each of said maximum time intervals;
wherein said step of transmitting said data signal includes the step of determining the transmission time during each said maximum time intervals in accordance with said random number provided for said each of said maximum time intervals: and each of said maximum time intervals comprises a fixed time interval plus a variable time interval, said variable time interval being determined in accordance with said random number provided for said maximum time interval, and wherein said fixed time interval is at least one order of magnitude greater than said variable time interval, and wherein said transmission times occur in accordance with said variable time intervals.

16. A data transmission method according to claim 15 wherein said step of establishing said maximum time intervals comprises establishing a fixed time interval, and determining said maximum time intervals in accordance with said fixed time interval.

17. A data transmission method according to claim 15 wherein each of said maximum time intervals are equal in duration and correspond to a fixed time interval.

18. A data transmission method according to claim 15 wherein said transmitting step includes the steps of transmitting said data signal via wireless signal radiation.

19. A data transmission method according to claim 15 wherein said data signal providing step includes the step of providing a utility meter means and wherein said data signal is indicative of the use of a utility as measured by said utility meter means.

20. Data transmission device for use in a system comprising a plurality of such data transmission devices, said data transmission device comprising:
means for providing a data signal for transmission;
timer means for establishing, in response to an initial power on signal received by the device, a continuous sequence of maximum time intervals during which said data signal can be transmitted; and
means for transmitting said data signal at a transmission time during each of said maximum time intervals;
said timer means including a random number generator for providing a random number for each of said maximum time intervals, said transmitting means determining the transmission time for said data signal during each of said maximum time intervals in accordance with said one of said random numbers provided for said each of said maximum time intervals; plus a variable time interval, said variable time interval being determined in accordance with said random number provided for each of said maximum time intervals, said variable time interval being determined by a microprocessor which utilizes said random numbers to provide said variable time interval, and said fixed time interval provided by a fixed time interval circuit external to said microprocessor, and said transmission times occur in accordance with said variable time intervals.

21. A data transmission device according to claim 20 wherein said fixed time interval is at least one order of magnitude greater than said variable time interval.

22. A data transmission system comprising;
a plurality of data transmission devices each independently operative for transmitting its own data signal and;
a data receiver means for receiving the transmitted data signals from each of said plurality of data transmission devices;
each of said data transmission devices comprising;
means for providing a data signal for transmission;
timer means for establishing, in response to an initial power on signal received by the device, a continuous sequence of maximum time intervals during which said data signal can be transmitted; and
means for transmitting said data signal at a transmission time during each of said maximum time intervals;
said timer means including a random number generator for providing a random number for each of said maximum time intervals, said transmitting means determining the transmission time for said data signal during each of said maximum time intervals in accordance with sad one of said random numbers provided for said each of said maximum time intervals;
wherein each of said maximum time intervals comprises a fixed time interval plus a variable time interval, said variable time interval being determined in accordance with said random number provided for each of said maximum time intervals, said variable time interval being determined by a microprocessor which utilizes said random numbers to provide said variable time interval, and said fixed time interval provided by a fixed time interval circuit external to said microprocessor, and said transmission times occur in accordance with said variable time intervals.

23. A data transmission system according to claim 22 wherein said fixed time interval is at least one order of magnitude greater than said variable time interval.

24. Data transmission method comprising the steps of; providing a data signal for transmission,
establishing, in response to an initial received power on signal, a continuous sequence of maximum time intervals during which said data signal will be transmitted;
transmitting said data signal at a transmission time during each of said maximum time intervals; and
providing a random number for each of said maximum time intervals;
wherein said step of transmitting :said data signal includes the step of determining the transmission time during each said maximum time intervals in accordance with said random number provided for said each of said maximum time intervals, and wherein each of said maximum time intervals comprises a fixed time interval plus a variable time interval, said variable time interval being determined in accordance with said random number provided for each of said maximum time intervals, said variable time interval being determined by a microprocessor which utilizes said random numbers to provide said Variable time interval, and said fixed time interval provided by a fixed time interval circuit external to said microprocessor, and wherein said transmission times occur in accordance with said variable time intervals.

25. A data transmission method according to claim 30 wherein said fixed time interval is at least one order of magnitude greater than said variable time interval.

* * * * *

UNITED STATES PATENT AND TRADEMARK OFFICE

CERTIFICATE OF CORRECTION

PATENT NO. : 5,383,134
DATED : Jan. 17, 1995
INVENTOR(S) : Stanley Wrzesinski

It is certified that error appears in the above-indentified patent and that said Letters Patent is hereby corrected as shown below:

In claim 2, col. 9, line 55, after "and" delete ",".

In claim 10, col. 10, line 51, the word "Said" should be --said--.

In claim 20, col. 11, line 62, after "intervals;" add --wherein each of said maximum time intervals comprises a fixed time interval--.

In claim 24, col. 12, line 68 the word "Variable" should be --variable--.

In claim 25, col. 13, line 5, delete "30" and insert --24--.

Signed and Sealed this

Twenty-seventh Day of February, 1996

Attest:

BRUCE LEHMAN

Attesting Officer

Commissioner of Patents and Trademarks